UNITED STATES PATENT OFFICE.

MICHAEL T. MAGUIRE, OF PHILADELPHIA, PENNSYLVANIA.

LEATHER-DRESSING.

SPECIFICATION forming part of Letters Patent No. 578,413, dated March 9, 1897.

Application filed February 23, 1892. Serial No. 422,455. (No specimens.)

*To all whom it may concern:*

Be it known that I, MICHAEL T. MAGUIRE, a citizen of the United States, residing at Philadelphia, in the county of Philadelphia and State of Pennsylvania, have invented certain new and useful Improvements in Leather-Dressing, of which the following is a specification, reference being had therein to the accompanying drawings.

The object of my present invention is to produce a dressing for leather goods—such as harness, buggy-tops, shoes, &c.—which can be manufactured at a slight cost and which will not injure the leather.

With this object in view the invention consists in the composition which will be hereinafter described and claimed.

In carrying out my invention I employ Japan wax, paraffin-oil, neat's-foot oil, anilin-black, and beef-oil, these ingredients being used in the following proportion, to wit: Japan wax, twenty pounds; paraffin-oil, seven gallons; neat's-foot oil, one pint; anilin-black fats color, five ounces, and beef-oil three or four pounds.

The Japan wax and beef-oil are first placed in a suitable receptacle and then allowed to rest until thoroughly dissolved and reduced into a liquid state. I then put in the black anilin color and follow it with the paraffin-oil and neat's-foot oil. I then boil the composition for about half an hour, after which it is ready for use. The dressing is generally put in boxes to be sold, but it is obvious that the manner of carrying it is immaterial.

When it is desired to use the dressing, the leather is first wiped clean, and the dressing is then applied with a woolen rag or a sponge without any water. When thus applied, it imparts to the leather a gloss which does not fade or tarnish when the goods are handled.

My improved dressing does not crack the leather, but renders it soft and pliable, and is thoroughly waterproof.

Having thus described my invention, what I claim, and desire to secure by Letters Patent, is—

The herein-described dressing for leather, consisting of Japan wax, paraffin-oil, neat's-foot oil, anilin-black, and beef-oil, in substantially the proportions specified.

In testimony whereof I affix my signature in the presence of two witnesses.

MICHAEL T. MAGUIRE.

Witnesses:
G. A. BAUMANN,
HENRY W. PATRICK.